United States Patent [19]
Felsenthal, Jr.

[11] 3,861,220
[45] Jan. 21, 1975

[54] MICROWAVE GYRO

[75] Inventor: Harry D. Felsenthal, Jr., Camarillo, Calif.

[73] Assignee: The United States of America as represented by the Secretary of the Navy, Washington, D.C.

[22] Filed: Oct. 26, 1973

[21] Appl. No.: 410,123

[52] U.S. Cl. ................................ 73/505, 73/517 A
[51] Int. Cl. ......................................... G01p 15/08
[58] Field of Search ............... 73/505, 517 A; 74/5; 235/150.25

[56] References Cited
UNITED STATES PATENTS

| | | | |
|---|---|---|---|
| 3,102,953 | 9/1963 | Wallace | 73/505 X |
| 3,218,871 | 11/1965 | Dressler et al. | 73/505 |
| 3,395,270 | 7/1968 | Speller | 73/505 X |
| 3,657,927 | 4/1972 | Tyson | 73/505 |

Primary Examiner—James J. Gill
Attorney, Agent, or Firm—Richard S. Sciascia; Joseph M. St. Amand

[57] ABSTRACT

A system for measuring angular velocity by comparing the frequencies of oppositely-directed microwave signals. In one embodiment, a gyro is disclosed in which a circular waveguide loop is used and oppositely directed signals are read out separately for comparison of their frequencies and phases. Angular velocity of the gyro about an axis perpendicular to the plane of the loop results in a difference in frequency between the two output signals. The difference in phase between these signals, being proportional to the time integral of the frequency difference, is thus proportional to the angular position of the gyro.

18 Claims, 5 Drawing Figures

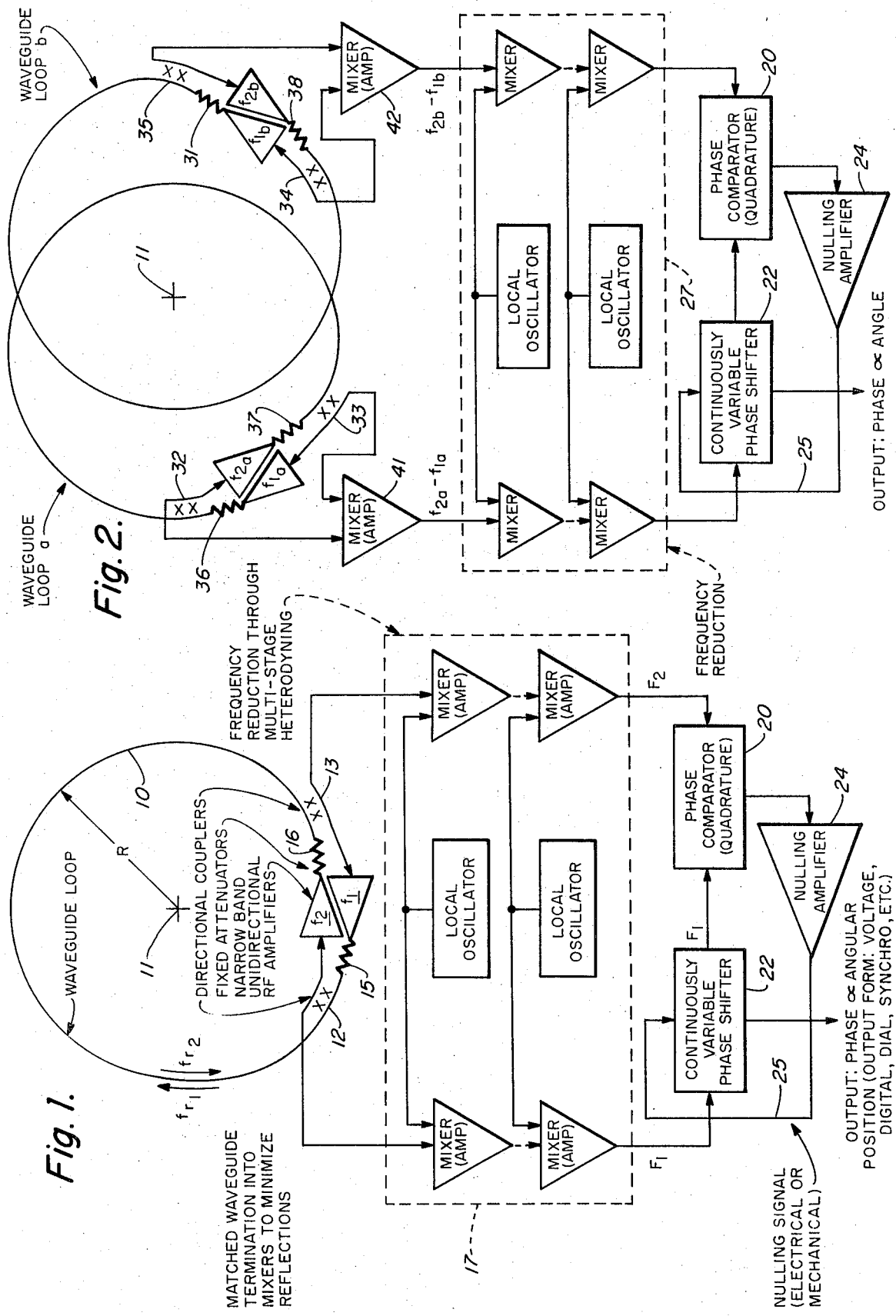

MICROWAVE GYRO

BACKGROUND OF THE DISCLOSURE

The present invention relates to rotational motion or angular rate sensing apparatus. More particularly, the invention relates to microwave gyroscopes and particularly to a microwave gyroscope wherein oppositely directed microwave beams are transmitted over a closed waveguide path, and the resulting frequency shift gives an indication of the relative rotation of the gyro. This system has the advantage that phase locking at low rates of angular rotation is eliminated, and several embodiments are disclosed.

The only system somewhat similar to the present invention involves the ring laser. All known embodiments of the ring laser, including those with frequency biasing to avoid frequency locking, are subject to random fluctuations in the output frequency, due to several causes, including convection currents in the laser plasma and variations in the relative and total intensities of the two contra-rotating beams, i.e., winking. These fluctuations may have a non-zero average, resulting in a drift less than but analogous to the drift experienced with mechanical gyros. The winking results from the fact that both contra-rotating beams are generated by the lasing action of the same set of atoms, i.e., those having a given instantaneous thermal velocity component parallel to the light path, with all types of frequency biasing.

Several schemes have been used in the past, none of which have all the advantages of the present invention. For example, prior schemes involving lasers have used: frequency biasing with Faraday rotators and birefringent material; frequency biasing by Zeeman effect frequency splitting; frequency biasing by mechanical vibration of a ring laser, i.e., sinusoidal plus random noise, with no net bias in either direction; frequency biasing by mechanically rotating transparent discs; frequency biasing by suppressed carrier double sideband frequency modulation of one beam but no modulation of the other beam, resulting in two frequencies in one direction and one frequency in the other direction; and, a three-frequency scheme, with no frequency biasing, where the frequencies are in three mutually perpendicular loops in one unit comprising a three-axis gyro.

In all prior cases, the convection currents are present with resultant irreducible error.

None of the prior schemes make use of a dispersive propagating medium, and none treat the random fluctuation in the output frequency, as in the present invention.

SUMMARY OF THE INVENTION

The present invention provides a microwave gyroscope somewhat similar in principle to a laser gyroscope, but having the advantage that phase locking at low rates of angular rotation is eliminated.

It is an object of the invention to provide a microwave gyroscope having one waveguide loop with a modulated signal travelling in one direction only, use being made of the dispersion characteristic of the waveguide, which causes the propagation velocities of the carrier and the modulation to differ.

It is also an object to provide a microwave gyroscope having two waveguide loops, each with a modulated signal travelling in one direction and with the signal in one oppositely directed from that in the other, and also using the dispersion characteristics of the waveguide which cause the propagation velocities of the carrier and the modulation to differ.

Another object is to provide a microwave gyro having one waveguide loop with two frequencies, one frequency in each direction.

Still another object is to provide a microwave gyro having two waveguide loops, one loop with the high frequency in a clockwise direction and the other loop with the higher frequency in a counterclockwise direction.

Still another object is to provide a microwave rotational motion sensing apparatus.

A further object is to provide a microwave gyroscope having one waveguide loop with three frequencies, the center frequency travelling in one direction and the other two travelling in the opposite direction.

Still a further object is to provide a microwave gyroscope using completely separate sources for the contra-rotating signals in the various embodiments to eliminate or considerably reduce the sources or error found in prior devices.

It is still another object of the invention to provide a microwave gyro having extreme sensitivity and accuracy.

It is still a further object to provide a microwave gyro which can be used as an accurate angular position reference with respect to inertial space.

Other objects, advantages and novel features of the invention will become apparent from the following detailed description of the invention when considered in conjunction with the accompanying drawings.

BRIEF DESCRIPTION OF THE DRAWINGS

FIG. 1 is a schematic block diagram of a single waveguide loop microwave gyro of the present invention.

FIG. 2 is a block diagram illustrating one embodiment of a two-loop microwave gyro.

DESCRIPTION OF THE PREFERRED EMBODIMENT

Figure 4:
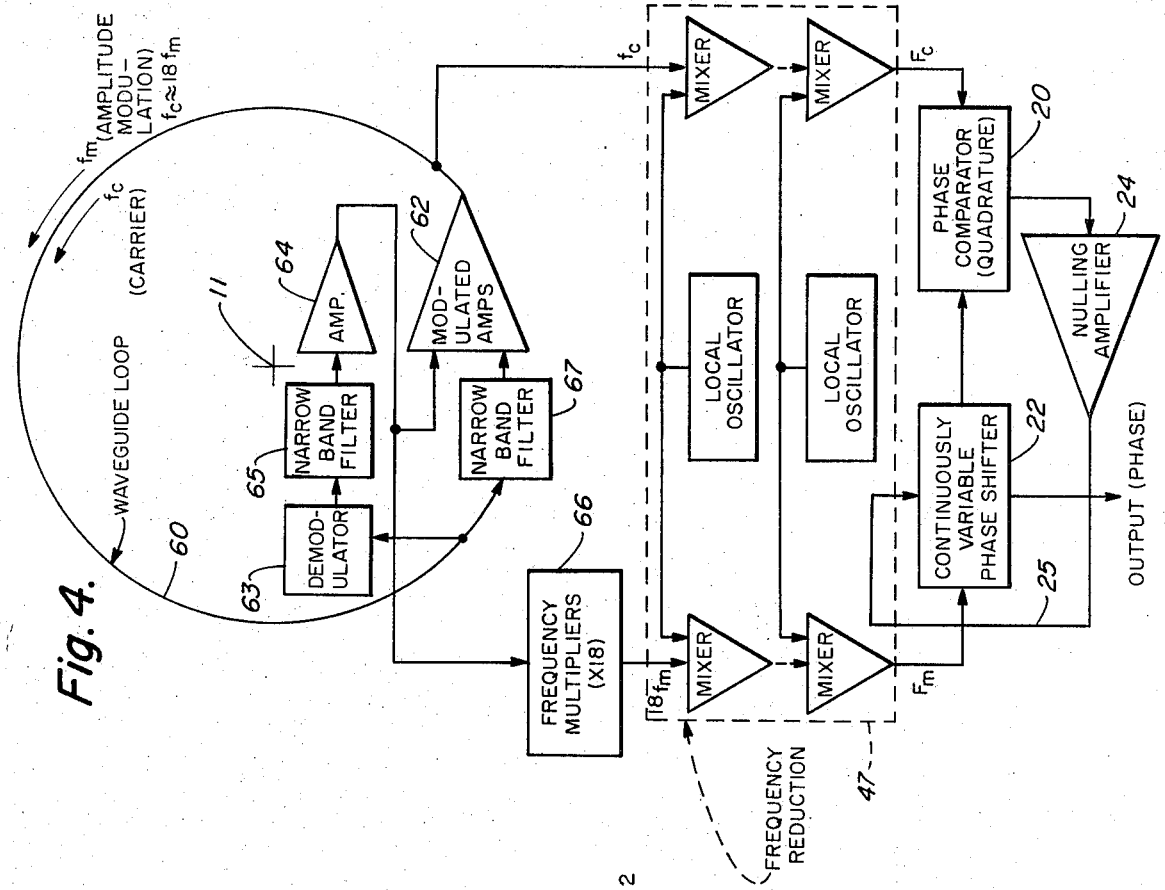
FIG. 4 illustrates still another embodiment involving a single waveguide loop microwave gyro.

A microwave ring gyro which has stable low drift operation is hereinafter described. Several embodiments, including the tolerances required, are discussed.

In the microwave gyro, a circular loop of waveguide is used instead of a square or triangular loop, as used in a ring laser. The waveguide loop does not have to be circular; but use of a circular loop simplifies theh calculations of frequency versus angular rate, and also maximizes the sensitivity obtainable from a given size of loop. For a circle of radius $R$, $A/P = R/2$, where $A$ is the area enclosed by the loop and $P$ is length of the loop. The output frequency $$\Delta f = 2R\omega/\lambda\phi \qquad (1)$$

where: $\lambda\phi$ is the wavelength in the waveguide and $\omega$ is the angular velocity, in radians per unit time. In the microwave gyro, the oppositely directed signals are read out separately for comparison of their frequencies and phases. The high output frequencies, for example, about 100 gigahertz for discussion of design parameters, must be reduced to a low value, e.g., about 1 kilohertz, for phase comparison. Frequency reduction can be accomplished by several stages of heterodyning, using the same reference oscillator at each stage for mixing with both signals. Essential to this procedure is the fact that when two signals are charged in frequency by the same amount by the same local, i.e. reference, oscillator, their relative phases are maintained the same at the new frequency.

Angular velocity of the microwave gyro about an axis perpendicular to the plane of the waveguide loop results in a difference in frequency between the two output signals. The difference in phase between the two output signals, being proportional to the time integral of the frequency difference, is thus proportional to the angular position of the gryo, relative to some arbitrary reference position.

A block diagram of a single loop microwave gyro is shown in FIG. 1. A waveguide loop 10, having a given radius R, encloses the axis of rotation 11 of the gyro about which angular motion is to be measured. The gyro axis 11 is perpendicular to the plane of the waveguide loop 10, i.e., perpendicular to the plane of the drawing. Continuous wave (CW) signals are maintained in opposite directions, as shown, around a waveguide loop 10 by respective narrow band radio frequency (RF) amplifiers $f_1$ and $f_2$. The exact frequency $fr_1$ and $fr_2$ in each direction is controlled by the effective length of the loop 10 in each direction, an integral number of half-wavelengths being maintained in the loop. The bandwidth of amplifiers $f_1$ and $f_2$ must be narrow enough to select the desired number of wavelengths in loop 10. The two signals are isolated from each other by unidirectional amplifiers $f_1$ and $f_2$ and directional couplers 12 and 13. Each amplifier $f_1$ and $f_2$ receives the unwanted oppositely directed signal at its output end and must absorb, rather than reflect, this is to prevent backscatter and consequent frequency locking. To do this effectively, it may be necessary to insert some attenuation (for example, about 10 decibels) by means of attenuators 15 and 16, respectively, at the output of each amplifier, and to increase the amplifier gains accordingly. For an example: 100 gigahertz in a 0.100 × 0.050 inch waveguide with a loop circumference of 135 centimeters, the waveguide attenuation will be about 4 decibels. This, plus a 3 db power-splitting loss in each directional coupler, will require amplifier gains of about 10 db, plus the added attenuation, if any, or about 10 to 20 db total gain. The two loop frequencies $fr_1$ and $fr_2$ are heterodyned in several steps by multi-stage heterodyning 17 to low frequencies $F_1$ and $F_2$, respectively, of about 1 kilohertz for phase comparison. It should be noted that frequency dividing circuitry could be used for the frequency reduction means 17, however, such would result in a loss of sensitivity of the overall system. The phases are compared by shifting the phase of one of the signals. $f_1$ for example, so that the two signals are maintained at quadrature in phase comparator 20. At quadrature the phase comparator output is a null signal; any deviation from a null is fed back to phase shifter 22 via nulling amplifier 24 in the feedback loop 25 to maintain the null output of the phase comparator. Of the two quadrature phases (+90° and −90°), one will be an unstable position because of the feedback to the phase shifter; the other phase will be maintained by the feedback loop 25.

As an example, a microwave frequency of 100 gigahertz is selected. This is near the present state-of-the-art upper frequency limit for solid state near amplifiers of either the cavity or the travelling wave type. Both amplifier types, as well as the tunnel diode, etc., can be used. In the design of a waveguide system and selection of the amplifier type, it is important that the portion of the waveguide 10 loop containing amplifiers $f_1$ and $f_2$, which is not common to both the clockwise and counterclockwise paths, be kept as short as possible so as to minimize changes in the relative electrical lengths in the two directions due to dimensional instabilities.

The following design parameters are used as an example in discussion of the operation of the microwave gyro:

$f_0$ = 100 gigahertz (non-rotating)
Waveguide inside dimensions: 0.100 × 0.050 inches
$\lambda\phi$ = 0.372 cm. (phase wavelength)
R = 21.3 cm. (This results in 360 wavelengths around the loop, or one wavelength per degree of angular rotation and the loop diameter is thus 17 inches.)
Heterodyning in four steps, from 100 ghz to 1 khz, reducing the frequency by a factor of 100 at each step.

With the above parameters, at an angular rate of one radian per second, the output frequency $\Delta f$ (equation 1), or $\Delta F$, will be 114.5 hertz. At the earth's sidereal rate of 7.29 × $10^{-5}$ radians per second, $\Delta F$ will be 0.00835 hertz; or 0.50 cycles per minute. A change of 1° in the angular position of the gyro, about the axis of rotation 11, will result in a change in the relative phase between frequencies $F_1$ and $F_2$ ($\Delta\phi$) of 720°. If $\Delta\phi$ is read out to ±2.5° of phase, then the gyro angular position can be read to ±0.2 minutes of arc.

Even with the directional couplers 12 and 13 and the unidirectional amplifiers $f_1$ and $f_2$, as shown in FIG. 1, there may be sufficient backscatter of the signals to cause frequency locking, with a resultant dead zone at very low angular rates. Several methods of avoiding this problem are found in other embodiments hereinafter discussed.

In FIG. 2, the signals circulating in the two directions around the loop differ in frequency (for example, 259 wavelengths at 99.722 ghz in one direction and 360 wavelengths at 100.000 ghz in the other). Two loops $a$ and $b$ are used in this embodiment, one with the higher frequency in the clockwise direction, the other counterclockwise. The centers of the two loops are both about axis 11 and the loops substantially overlap, although this is not shown in FIG. 2 for illustration purposes. Bandwidth amplifiers $f_{1a}$ and $f_{2a}$, and $f_{1b}$ and $f_{2b}$ are provided for loops $a$ and $b$, respectively. Directional couplers 32, 33, and 34, 35, as well as attenuators 36, 37 and 38, 31, respectively, are also provided, as in FIG. 2, for each of loops $a$ and $b$. The two output frequencies of each of the loops $a$ and $b$ are combined in mixers 41 and 42, respectively, to produce difference frequencies which differ slightly from each other when the unit is rotating about axis 11. These are then heterodyned down to a low frequency of about 1 kilohertz for phase comparison, by frequency reduction circuitry 27, as in FIG. 1. With the frequencies and numbers of wavelengths given above, an angular rate of one radian per second will result in an output frequency $\Delta F$ of 229 hertz. This is twice the output frequency of the circuit of FIG. 1, since two frequency differences are being effectively added together.

Figure 3:
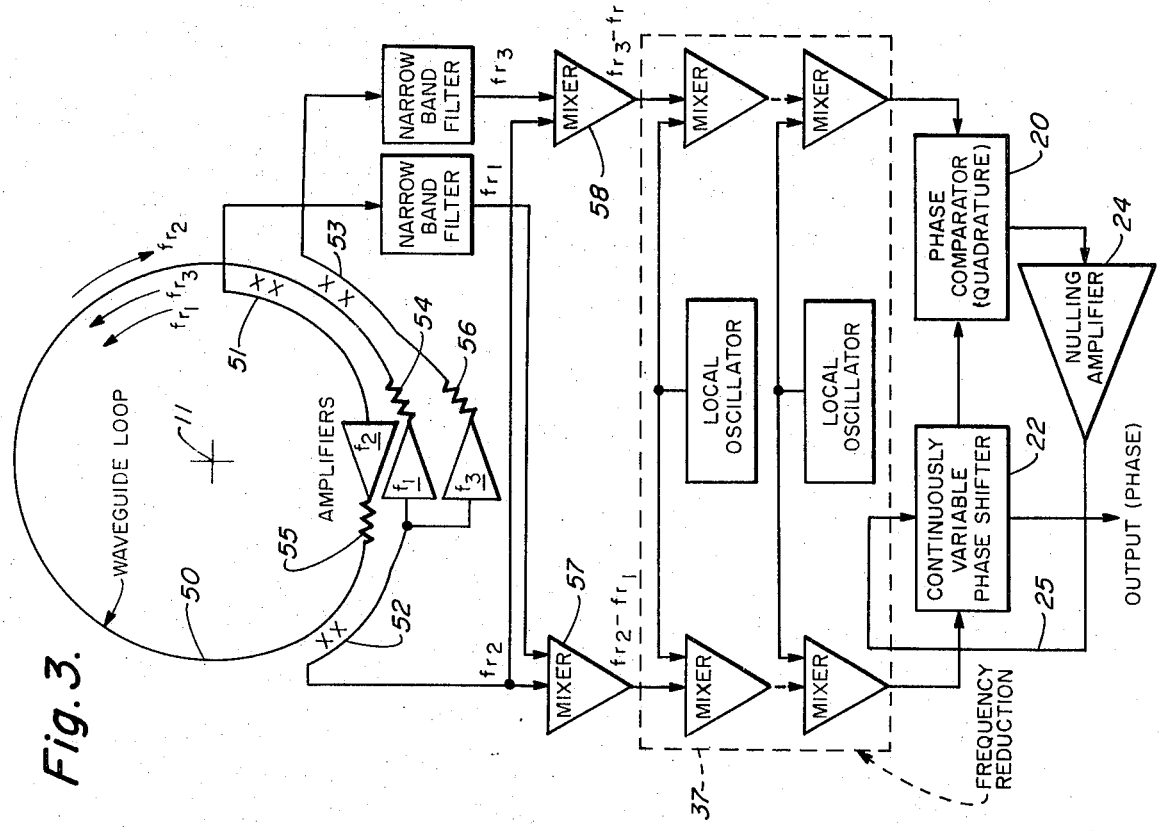
FIG. 3 shows another embodiment of a single loop microwave gyro.

In the embodiment shown in the block diagram of FIG. 3, three frequencies are circulated in a single waveguide loop 50. The highest frequency $fr_3$, for example, 361 wavelengths at 100.278 ghz) and the lowest frequency $fr_1$ (for example, 359 wavelengths at 99.722 ghz) circulate in one direction; the center frequency $fr_2$ (midway between $fr_1$ and $fr_3$) maintain the three frequencies $fr_1$, $fr_2$, and $fr_3$, respectively. Directional couplers 51, 52, 53 and attenuators 54, 55, and 56 are also provided, as in the previously discussed embodiments. The difference frequencies, $(fr_3 - fr_2)$ and $(fr_2 - fr_1)$, are generated in mixers 57 and 58 and reduced to low frequencies by frequency reduction circuitry 37 for phase comparison, as in FIGS. 1 and 2. With the above frequencies and numbers of wavelengths, an output frequency of 229 hertz will result from an angular rate of one radian per second, as in FIG. 2.

In FIG. 4 is shown an arrangement whereby microwave signals travelling in only one direction around a waveguide loop 60 are used. This avoids the problem of absorbing oppositely directed signals in the amplifiers. An amplitude modulated signal $f_m$ is used; operation is based on the dispersion characteristic of a waveguide, with the consequent difference between phase and group velocities. Amplifier 62 generates the carrier frequency $f_c$ and the amplitude modulation $f_m$ on the carrier frequency. Amplifier 64 is used to amplify the modulation frequency $f_m$. Amplitude modulated signal $f_m$ from amplifier 62 is used to maintain modulation in loop 60 in a manner analogous to that in which the amplifier maintains the carrier signal $f_c$. Demodulator 63 is used to eliminate the carrier signal $f_c$ and recover the modulated signal $f_m$, which is amplified by amplifier 64. A narrow band filter 65, which precedes amplifier 64, is used to maintain only one mode of the modulation frequency $f_m$ in the loop.

In an analysis of the FIG. 4 block diagram, the following design parameters are used:

Waveguide inside dimensions: $0.080 \times 0.040$ inches. (A smaller size than in the other systems was selected to increase the difference between the phase and group velocities.)

$f_o$ (carrier frequency) = 95.25 ghz (non-rotating)
$V_\phi$ (phase velocity) = $4.74 \times 10^{10}$ cm./sec.
$\lambda\phi$ (carrier wavelengt) = 0.500 cm. wavelength)
$f_{mo}$ (modulation frequency) = $f_o/18$ = 5.292 ghz (non-rotating)
$V_g$ (group velocity) = $1.898 \times 10^{10}$ cm./sec.
$\lambda_m$ (modulation wavelength) = 3.60 cm.
$(V_\phi = 2.5 V_g; \lambda_m = 7.2 \lambda\phi)$
$R$ = 28.65 cm. (This results in 360 carrier wavelengths and 50 modulation wavelengths around the loop.)

The transverse time around the loop is:

$$T_0 = 2\pi r/V \text{ (non-rotating)} \quad (2)$$

$$T = 2\pi r/V \pm R\omega \text{ (+ with signal travelling} \quad (3)$$

opposite the rotation; − with signal travelling with the rotation) where: $V$ is the propagation velocity (phase or group, as applicable). The signal frequency when the unit is rotating is:

$$f = f_0 T_0/T = f_0 (1 \pm R\omega/V) \quad (4)$$

In this embodiment, the modulation frequency $f_m$ was one-eighteenth of the carrier frequency $f_c$. Therefore, the carrier amplifier 62 must have a broad bandwidth to accommodate the sidebands, and must be preceded by a narrow band filter 67 (such as a waveguide iris arrangement) so that only the desired oscillation mode of carrier frequency $f_c$, or number of wavelenghts in the loop, is maintained. Amplifier 62 is capable of being modulated; for example, a maser amplifier can be used and modulate the pumping power thereto. An integral number of half-cycles of modulation $f_m$ in waveguide loop 60 in a manner analogous to that for maintaining the carrier oscillation $f_c$, i.e., by controlling the effective length of the waveguide loop 60. The modulation output frequency is raised by a factor of 18 through frequency multipliers 66. The two frequencies, $f_c$ and 18 $f_m$, are then reduced by means of circuitry 47 to low frequencies $F_c$ and $F_m$ for phase comparison, as in FIG. 2.

Substituting the defined quantities into equation (4):
$f_c = f_0 (1 \pm R\omega/V_\phi)$
$18 f_m = f_0 (1 \pm R\omega/V_g)$
$18 f_m - f_c = \pm f_0 R (1/V_g - 1/V_\phi)\omega = \pm [f_0 R(V_\phi - V_g)]/(V_\phi V_g)\omega$ or;
$\Delta F = F_m - F_c = 86.25\omega$, with the numerical values.

Figure 5:
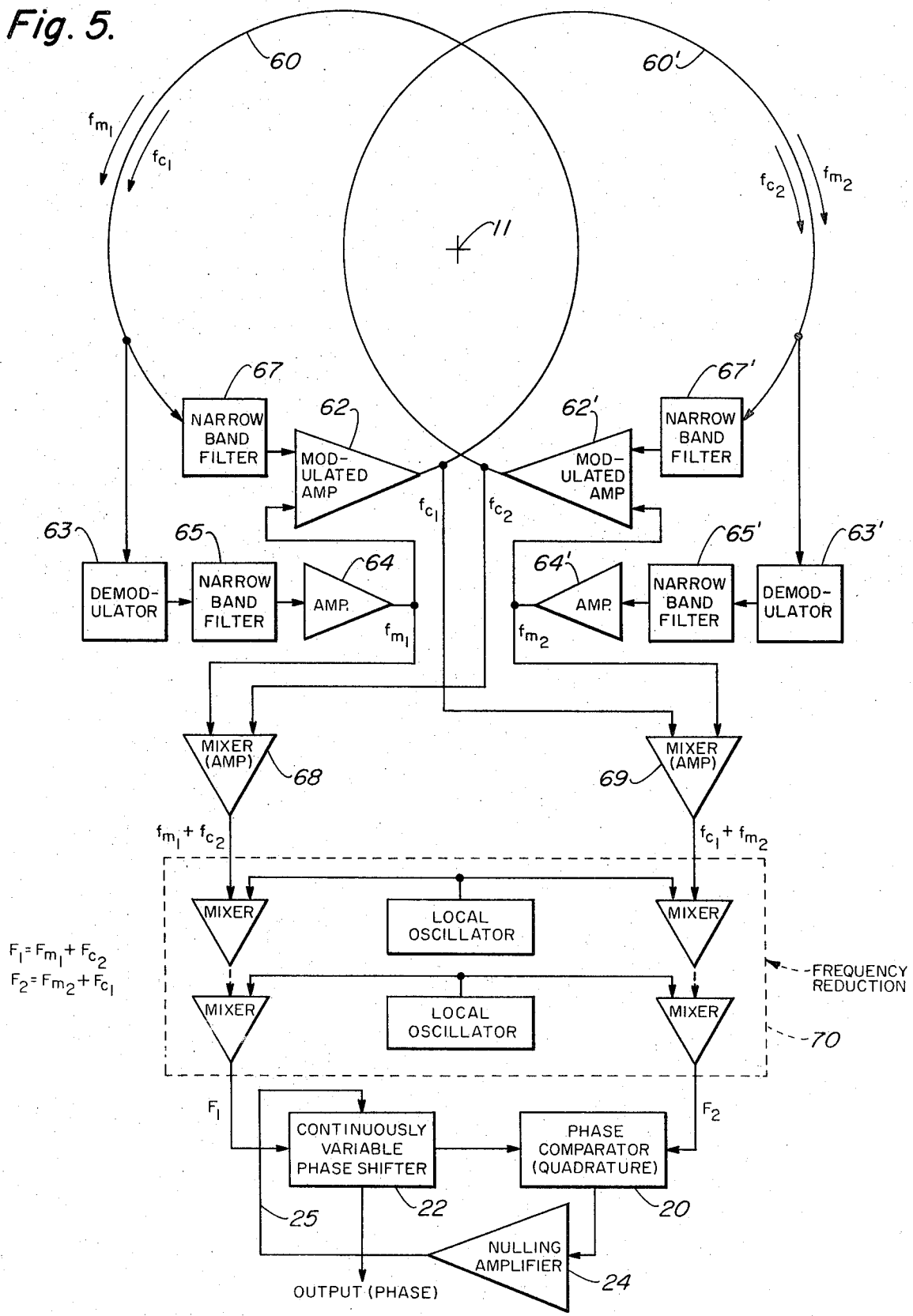
FIG. 5 also shows a different embodiment using more than one waveguide loop for a microwave gyro.

In some instances it may be difficult to obtain parameters that maintain $V_{323}$ at exactly $2.5 V_g$, and, thus, $f_m$ at exactly one-eighteenth of $f_c$. In such cases, two of the unidirectional waveguide loops of FIG. 4 can be used, as illustrated in FIG. 5, with the modulated signals traversing the two loops in opposite directions. The output frequencies of the first loop are $f_{m1}$ and $f_{c1}$; those of the second loop are $f_{m2}$ and $f_{c2}$. Frequencies $f_{m1}$ and $f_{c2}$ are then added in mixer 68; frequencies $f_{m2}$ and $f_{c1}$ are added in mixer 69. The two resultant frequencies, $F_1 = f_{m1} + f_{c2}$ and $F_2 = f_{m2}$ 30 $f_{c1}$, are reduced by means of circuitry 70 and then compared in phase, as in FIG. 1. An angular rate of one radian per second will then generate an output frequency $\Delta F$ of $2 \times 86.25$, or 172.5 hertz. Where a plurality of loops are used, each have the same axis of rotation 11, although this is not shown in the block diagram of FIG. 5.

Another method of doing this is to use two complete circuits as in FIG. 4 and compare the outputs in a third phase comparator circuit, like 20, 22, 24 and 25.

Whether the mechanization uses one loop or two, it will be necessary to multiply the modulation signal by means of frequency multipliers, such as 66 in FIG. 4, to a value near the carrier frequency before the two outputs are processed for phase comparison, to minimize the effect of dimensional changes in the loop on the output of the system.

A critical design factor affecting the performance of the microwave gyro is the need to maintain absolutely equal electrical lengths in both branches of any waveguide loop (including all directional couplers, amplifiers, filters, attenuators, demodulators, modulators, etc.). For example, if the clockwise and counterclockwise paths of FIG. 1 differ by one part in one million, the resultant frequency difference will be 100 kilohertz, equivalent to an angular rate of 875 radians per second. Therefore, it is necessary to include a very precise and stable adjusting probe in each branch of the non-common portion of the microwave loop, so that the two path lengths can be exactly equalized at zero angular rate. It is also necessary to fabricate all waveguide components which are not common to all the signal paths of the loop (i.e., the sections between directional couplers containing the amplifiers, etc.) of very dimensionally stable material, such as fuzed silica or cer-vit, with deposited metal conducting surfaces. Temperature stabilization and mountings which are free from varying mechanical stresses may also be required in instances where temperature creates a problem.

If the two separate loops in FIG. 2 differ in length by one part in a million, the resultant frequency difference is 280 hertz, equivalent to an angular rate of 1.2 radians per second. This is small in comparison with the 875 radians per second in the example from FIG. 1 (which also applies to each of the two separate loops in FIG. 2) but the degree of dimensional stability that can be maintained between two completely separate loops is less than that obtainable between two loops which have most of their lengths in common. Therefore, where two completely separate loops are used, all waveguide components should be formed of low-expansion dimensionally stable material. Also, precise and stable electrical length adjustments should be provided in the common portion of each loop to equalize their lengths.

Where the complete waveguide structures are made of a metal-coated refractory material, such as fuzed silica or cer-vit, it may be more practicable to fabricate the loops in a rectangular form, with conventionally shaped corner elbows, than in the circular form used in the above discussions. The waveguides can consist of hollow, metal lined passages in a monolithic or built-up block of refractory material; of a metal-coated rods of the material, of rectangular or other appropriate waveguide cross section. In the latter case, the material is inside the waveguide, and the propagation velocities, wavelengths and attenuations are modified accordingly.

In selecting the type of amplifier to be used, several factors must be considered. The travelling wave maser has greater unidirectionality or front-to-back ratio than the cavity maser and also has greater bandwidth (necessary for the modulated signal in FIG. 3). The cavity maser has narrower bandwidth (necessary to CW operation), and minimizes the physical length of the non-common portions of the loop occupied by the amplifiers. In addition, the cavity maser, with a reverse isolation cavity, is alongside, rather than in, the main waveguide, and therefore has much less effect on the electrical length of the loop.

The output frequency of an electromagnetic gyro (either laser or microwave) is proportional to the ratio of the area A to the path length P. Increasing the size of a loop to a given shape increases the ratio A/P in proportion to the linear dimensions, thus increasing the sensitivity. Adding turns to the loop has no effect on the sensitivity, since both the area A and the path length P are increased by the same factor. However, the use of multi-turn loops can be advantageous in a microwave gyro, since this reduces the fraction of the total loop that is not common to all signal paths in the loop, tnus decreasing relative differences in electrical length between the signal paths.

Obviously many modifications and variations of the present invention are possible in the light of the above teachings. It is therefore to be understood that within the scope of the appended claims the invention may be practiced otherwise than as specifically described.

I claim:

1. Microwave gyro apparatus for accurately determining angular position, comprising:

a. at least one waveguide loop which lies in a plane perpendicular to the axis of rotation;
   b. a plurality of amplifier means each connected to respective waveguide terminations for generating and maintaining different continuous wave signals of which at least one of said signals travels in an opposite direction to at least one another signal around said at least one waveguide loop, each said amplifier means having suitable bandwidth for selecting a desired integral number of wavelengths in the waveguide loop;
   c. the exact frequency of said continuous wave signals in each direction also being controlled by waveguide loop effective length;
   d. directional couplers coupling said waveguide terminations with said amplifier means, said continuous wave signals in both directions being isolated from each other by said directional couplers together with said amplifier means;
   e. attenuation means connected to the output of each said amplifier means for absorbing unwanted oppositely directed signals to prevent backscatter and frequency locking, and to increase amplifier gains;
   f. frequency reduction means for lowering the frequencies of said continuous wave signals prior to phase comparison, respective continuous wave signals from the waveguide being fed to said frequency reduction means via said directional couplers;
   g. phase comparison means connected to two respective outputs of said frequency reduction means for determining the gyro angular position, angular velocity of the gyro apparatus about the axis of rotation resulting in a difference in frequency between two output signals, the difference between the two output signals being proportional to the time integral of the frequency difference and thus proportional to the angular position of the gyro relative to a reference position.

2. Apparatus as in claim 1 wherein said amplifier means are unidirectional narrow-band RF amplifiers.

3. Apparatus as in claim 1 wherein matched waveguide terminations are used to minimize reflections.

4. Apparatus as in claim 1 wherein the clockwise and counterclockwise path lengths in the waveguide loop are exactly equalized at zero angular rate.

5. Apparatus as in claim 1 wherein said at least one waveguide loop is circular.

6. Apparatus as in claim 1 wherein said at least one waveguide loop is rectangular.

7. Apparatus as in claim 1 wherein the sensitivity of the gyro increases by increasing the size of the loop.

8. Apparatus as in claim 1 wherein:

a. two waveguide loops are used;
   b. the first waveguide loop having the higher frequency signal of its opposing continuous wave signals travelling in a clockwise direction, and the second waveguide loop having its higher frequency signal travelling in a counterclockwise direction;
   c. first and second mixer means for combining the two output frequencies from each of said first and second loops, respectively, to produce two difference frequencies which differ slightly from each other when the apparatus is rotating;
   d. said two difference frequencies then being fed to said frequency reduction means prior to phase comparison.

9. Apparatus as in claim 8 wherein said two waveguide loops are formed from low expansion dimensionally stable material.

10. Apparatus as in claim 1 wherein:
   a. a single waveguide loop is used;
   b. three different continuous wave signal frequencies being circulated in said single loop by respective amplifiers;
   c. the highest and lowest of said three continuous wave frequencies being circulated in one direction, and the center frequency being circulated in the opposite direction;
   d. first and second mixer means for combining said highest and center output frequencies, and said lowest and center output frequencies, respectively, from said waveguide loop to produce two difference frequencies which differ from each other when the apparatus is rotated;
   e. said two difference frequencies then being fed to said frequency reduction means prior to phase comparison.

11. A microwave gyro apparatus for accurately determining angular position, comprising:
   a. at least one waveguide loop which lies in a plane perpendicular to the axis of rotation;
   b. a plurality of amplifier means connected to respective waveguide terminations for generating and maintaining a carrier frequency and an amplitude modulation frequency on said carrier frequency travelling in one direction around said at least one waveguide loop;
   c. said amplifier means having suitable bandwidth whereby a desired number of wavelengths in the waveguide loop are selected, the exact frequency of said carrier and modulated signals also being controlled by the waveguide loop effective length;
   d. a demodulator included in said amplifier means for recovering only the amplitude modulation output frequency from the carrier;
   e. phase comparison means to which respective carrier and amplitude modulation output frequencies from the said waveguide are fed for determining the gyro angular position, angular velocity of the gyro apparatus about the axis of rotation resulting in a difference in frequency between two output signals, the difference between the two output signals being proportional to the time integral of the frequency difference and thus proportional to the angular position of the gyro relative to a reference position.

12. Apparatus as in claim 11 whereby the amplifier means for generating the carrier frequency has broad bandwidth to accommodate sidebands and also includes narrow band filter means whereby only the desired oscillation mode of said carrier frequency is maintained in the loop; an integral number of half-cycles of modulation and carrier oscillation being maintained in the waveguide by controlling the effective length of the waveguide loop.

13. Apparatus in claim 11 whereby said amplifier means also includes means for amplifying the amplitude modulated frequency.

14. Gyro apparatus as in claim 11 wherein frequency multiplier means is provided to raise the amplitude modulation output frequency by a desired factor.

15. Gyro apparatus as in claim 11 wherein frequency reduction means is provided for lowering the respective carrier and amplitude modulation output frequencies prior to being fed to said phase comparison means.

16. Gyro apparatus as in claim 11 wherein:
   a. two waveguide loops are used;
   b. the modulation signals traversing the two loops are in opposite directions;
   c. a first mixer means provided for combining the first loop carrier output frequency and the second loop amplitude modulation output frequency, and a second mixer means for combining the second loop carrier output frequency and the first loop amplitude modulation output frequency, to produce two difference frequencies which differ from each other when the apparatus is rotating;
   d. said two difference frequencies being fed to said phase comparison means.

17. Gyro apparatus wherein two apparatuses as in claim 11 are used and the outputs of the two phase comparison means are compared in a third phase comparison means.

18. Gyro apparatus as in claim 11 wherein a plurality of waveguide loops are used and wherein said plurality of loops have their lengths substantially in common.

* * * * *